United States Patent
Paczkowski et al.

(10) Patent No.: US 9,667,665 B1
(45) Date of Patent: May 30, 2017

(54) SESSION INITIATION PROTOCOL (SIP) COMMUNICATIONS OVER TRUSTED HARDWARE

(71) Applicant: Sprint Communications Company L.P., Overland Park, KS (US)

(72) Inventors: Lyle Walter Paczkowski, Mission Hills, KS (US); Arun Rajagopal, Leawood, KS (US); Ronald R. Marquardt, Woodinville, WA (US)

(73) Assignee: Spring Communications Company L.P., Overland Park, KS (US)

( * ) Notice: Subject to any disclaimer, the term of this patent is extended or adjusted under 35 U.S.C. 154(b) by 281 days.

(21) Appl. No.: 14/630,978

(22) Filed: Feb. 25, 2015

(51) Int. Cl.
- G06F 15/16 (2006.01)
- H04L 29/06 (2006.01)
- H04L 29/08 (2006.01)
- H04W 28/22 (2009.01)

(52) U.S. Cl.
CPC .......... H04L 65/1006 (2013.01); H04L 29/06 (2013.01); H04L 29/08072 (2013.01); H04L 67/141 (2013.01); H04W 28/22 (2013.01)

(58) Field of Classification Search
CPC ... H04L 29/06; H04L 29/08072; H04L 25/02; H04W 28/22
USPC ......... 709/220, 224, 226, 228, 232; 370/235
See application file for complete search history.

(56) References Cited

U.S. PATENT DOCUMENTS

| | | | |
|---|---|---|---|
| 8,176,525 B2 | 5/2012 | Koehler, Jr. et al. | |
| 8,200,827 B1 | 6/2012 | Hunyady et al. | |
| 8,627,076 B2 * | 1/2014 | Krishnaswamy | H04L 63/08 713/168 |
| 8,635,693 B2 | 1/2014 | Ormazabal et al. | |
| 8,649,770 B1 | 2/2014 | Cope et al. | |
| 8,667,607 B2 | 3/2014 | Paczkowski et al. | |
| 8,705,518 B1 | 4/2014 | Afshar et al. | |
| 8,743,870 B2 | 6/2014 | Ramachandran et al. | |
| 8,752,140 B1 | 6/2014 | Paczkowski et al. | |
| 8,930,693 B2 | 1/2015 | Holt et al. | |
| 9,094,376 B2 * | 7/2015 | Krishnaswamy | H04L 63/08 |
| 9,467,103 B2 * | 10/2016 | Bushmaker | H03F 1/0272 |
| 2006/0182130 A1 | 8/2006 | Even et al. | |
| 2007/0147380 A1 | 6/2007 | Ormazabal et al. | |
| 2009/0141883 A1 * | 6/2009 | Bastien | H04L 63/00 379/213.01 |

(Continued)

*Primary Examiner* — Khanh Dinh

(57) ABSTRACT

A server system exchanges trust signaling with a first access network, establishes hardware trust with the first access network, and determines that the first access network has established hardware trust with a communication interface to a second access network. The server system exchanges Session Initiation Protocol (SIP) signaling with a SIP system, establishes hardware trust with the SIP system, and determines that the SIP system has established hardware trust with the second access network and a second communication device. The server system exchanges SIP signaling with a first communication device and establishes hardware trust with the first communication device. The server system receives a SIP Invite requesting a communication session between the first communication device and the second communication device over hardware-trusted systems, and based on the established hardware trust, the server system responsively forwards the SIP Invite to the SIP system for delivery to the second communication device.

18 Claims, 6 Drawing Sheets

(56) References Cited

U.S. PATENT DOCUMENTS

| | | | |
|---|---|---|---|
| 2011/0044184 A1* | 2/2011 | Balasaygun | G06F 9/543 370/252 |
| 2011/0170411 A1* | 7/2011 | Wang | H04W 76/02 370/235 |
| 2013/0042275 A1* | 2/2013 | Payette | H04N 21/2408 725/62 |
| 2013/0042276 A1* | 2/2013 | Payette | H04W 28/22 725/62 |
| 2013/0208729 A1 | 8/2013 | Evans et al. | |
| 2014/0122820 A1 | 5/2014 | Park et al. | |

* cited by examiner

US 9,667,665 B1

SESSION INITIATION PROTOCOL (SIP) COMMUNICATIONS OVER TRUSTED HARDWARE

TECHNICAL BACKGROUND

Internet Protocol (IP) is popular form of packet communications to exchange data between communication devices. The communication devices exchange IP packets for data services like internet access, media streaming, and file transfers. The communication devices are coupled to various IP access networks that are interconnected to one another over communication interfaces like core IP networks or direct communication links. The IP access networks may be wireless to provide user mobility. Long Term Evolution (LTE) Networks are exemplary wireless IP access networks.

Session Initiation Protocol (SIP) is a popular form of signaling to control the exchange of IP packets between communication devices for media streaming and other data transfer services. The communication devices register their IP addresses with the SIP systems over the IP access networks. The SIP control systems resolve names and numbers for the communication devices to their registered IP addresses. The SIP control systems use the registered IP addresses to exchange SIP messaging for the IP communications sessions. The end-user devices then exchange IP packets over the IP access networks and their communication interfaces. Internet Multimedia Subsystems (IMSs) are exemplary SIP control systems.

Hardware trust systems ensure communication network security and control. The hardware trust systems maintain physical separation between trusted hardware and untrusted hardware. The trust systems control software access to the trusted hardware but allow interaction between open and secure software components through secure bus interfaces, memories, time slices, and switching circuits. The trust systems establish trust with one another by using secret keys embedded in their hardware to generate hash results for remote verification by other trust systems also knowing the secret keys and the hash algorithms.

Communication networks also employ Network Function Virtualization (NFV) to improve service quality. NFV servers process virtual machines that operate as communication network elements such as gateways, controllers, databases, and the like. The NFV servers exchange data packets with other network elements like Ethernet switches and Internet Protocol (IP) routers to support data services like mobile internet access, user messaging, and media transfers. The NFV servers implement hypervisors and context switching to operate in a time-sliced manner. The NFV servers typically separate different virtual networks and/or services in the different NFV time slices.

Unfortunately, the trust systems and the NFV systems are not effectively integrated with the SIP systems.

TECHNICAL OVERVIEW

A server system exchanges trust signaling with a first access network, establishes hardware trust with the first access network, and determines that the first access network has established hardware trust with a communication interface to a second access network. The server system exchanges Session Initiation Protocol (SIP) signaling with a SIP system, establishes hardware trust with the SIP system, and determines that the SIP system has established hardware trust with the second access network and a second communication device. The server system exchanges SIP signaling with a first communication device and establishes hardware trust with the first communication device. The server system receives a SIP Invite requesting a communication session between the first communication device and the second communication device over hardware-trusted systems, and based on the hardware trust, the server system responsively forwards the SIP Invite to the SIP system for delivery to the second communication device.

DETAILED DESCRIPTION

Figure 1:
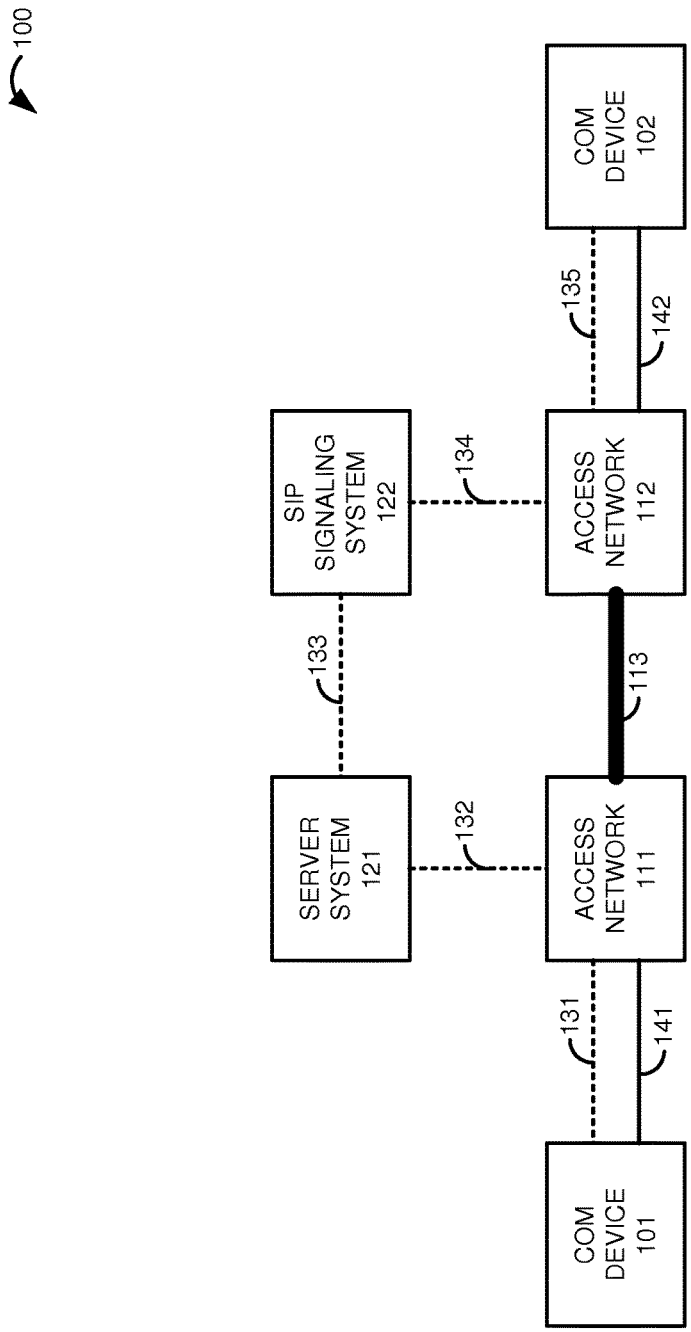
FIGS. 1-3 illustrate a communication system to establish data communication bearers over trusted hardware between communication devices.
Figure 2:
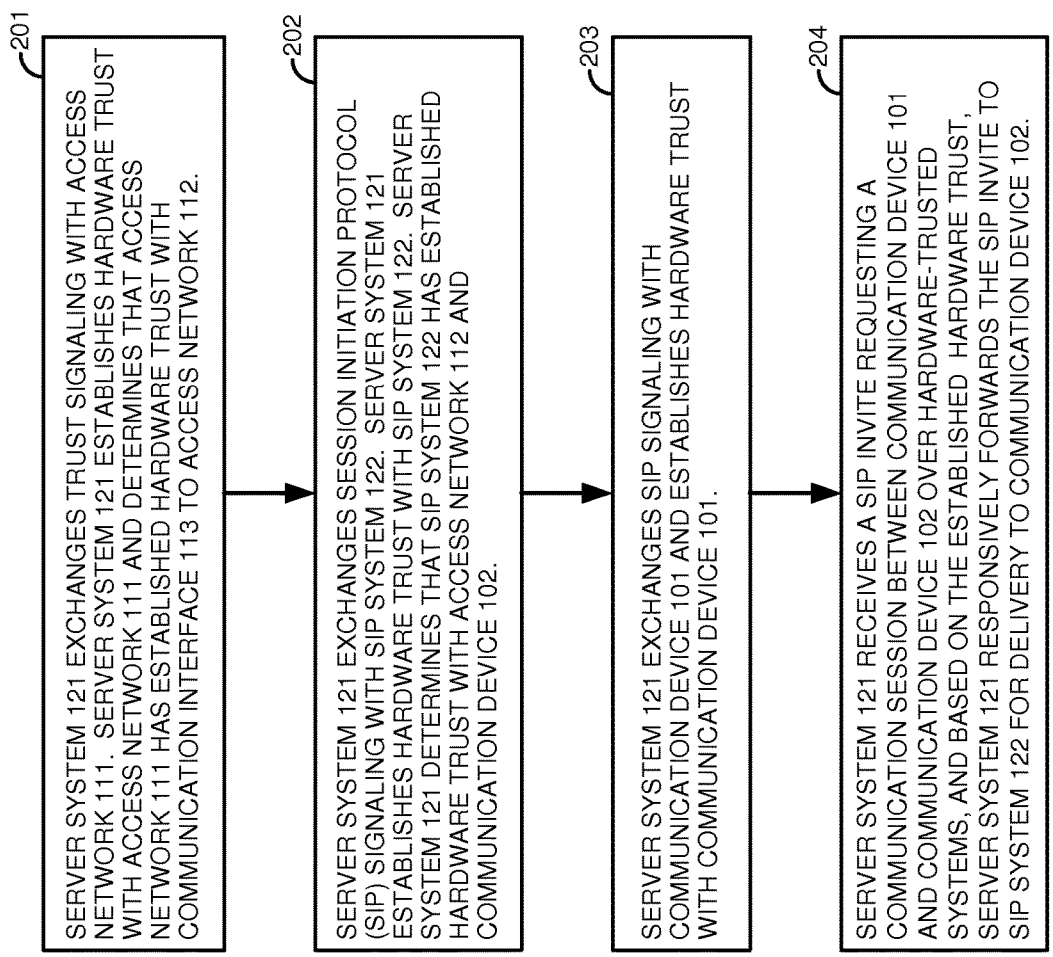
Figure 3:
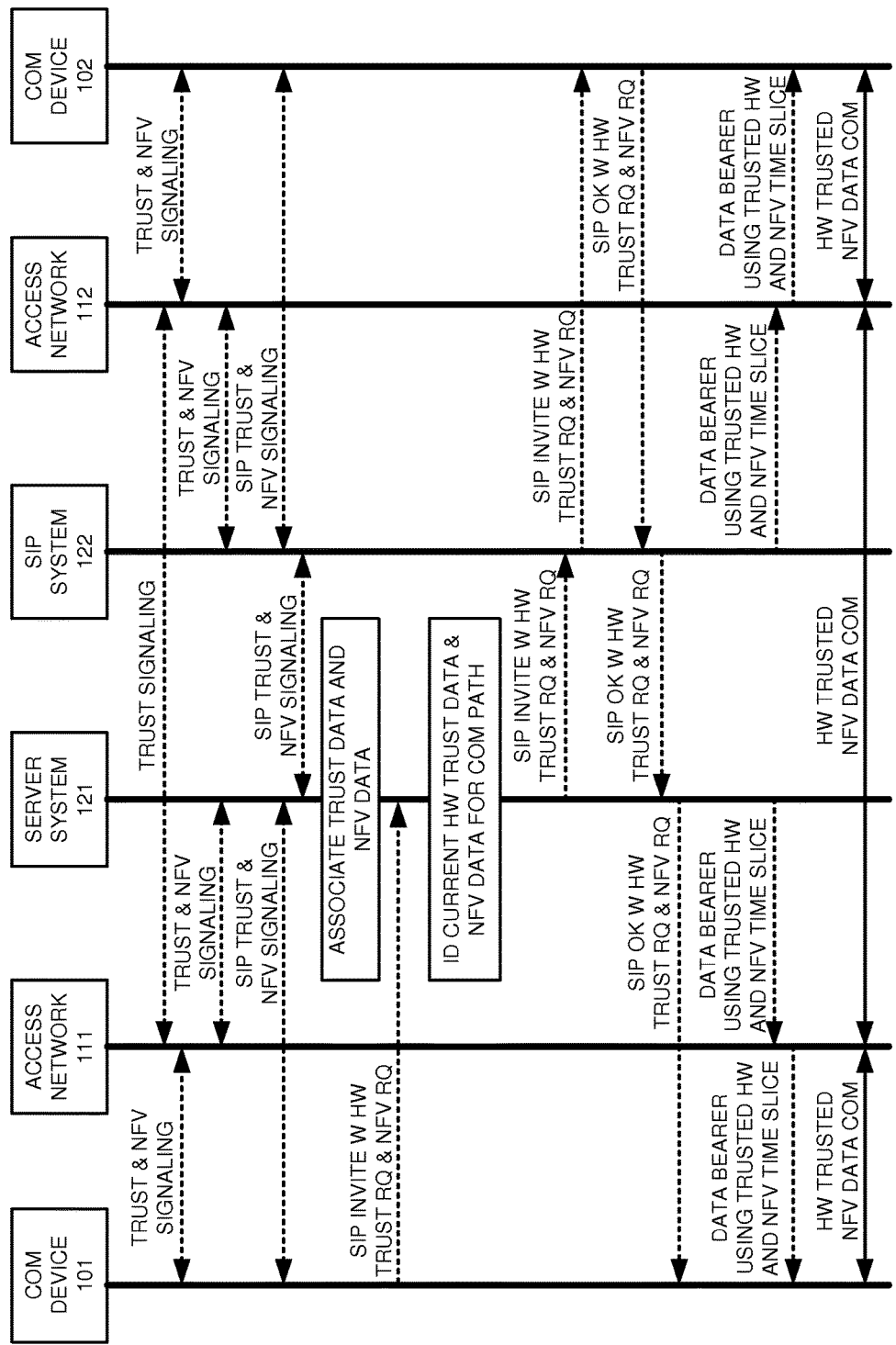

FIGS. 1-3 illustrate communication system 100 to establish data bearers 141-142 over trusted hardware between communication devices 101-102. Communication system 100 comprises communication devices 101-102, access networks 111-112, communication interface 113, server system 121, and Session Initiation Protocol (SIP) signaling system 122. FIG. 1 is exemplary, and in some examples, systems 121-122 could be the same system, and access networks 101-102 could be the same network.

Communication devices 101-102 comprise phones, tablet computers, servers, intelligent machines, and/or some other apparatus having a SIP transceiver.

Access networks 111-112 comprise wireless communication networks, fiber/coax communication networks, satellite communication systems, and/or some other data linkage between communication devices 101-102. In some examples, portions of access networks 111-112 use Network Function Virtualization (NFV) server systems running access network virtual machines. Exemplary NFV configurations and operations for communication system 100 are described with respect to FIG. 3 and FIG. 5.

Communication interface 113 comprises one or more data communication networks, systems, or links. In some examples, communication interface 113 comprises a core IP network. In other examples, communication interface 113 comprises a direct physical coupling like fiber cabling, backplane interfaces, and the like. In some examples, communication interface 113 might include an IP router or Ethernet switch. In some examples, communication interface 113 is a virtual link between virtual machines running on an NFV server system.

Server system 121 comprises a computer system having processing circuitry, memory devices, and communication transceivers that perform SIP proxy services. Likewise, SIP signaling system 122 comprises a computer system having processing circuitry, memory devices, and communication transceivers that perform SIP proxy services. In some examples, server system 121 and SIP signaling system 122 each comprise an Internet Multimedia Subsystem (IMS). In some examples, server system 121 and SIP signaling system 122 use NFV server systems running SIP and/or IMS virtual machines.

Communication device 101 and access network 111 communicate over data bearer 141. Access network 111 and access network 112 communicate over communication interface 113. Access network 112 and communication device 102 communicate over data bearer 142. Data bearers 141-142 might be wireless communication links, fiber/coax communication links, satellite communication links, and/or some other communication media between communication devices 101-102. In some cases, data bearers 141-142 are virtual links between virtual machines running on an NFV server system.

Communication device 101 and access network 111 communicate over signaling link 131. Access network 111 and server system 121 communicate over signaling link 132. Server system 121 and SIP signaling system 122 communicate over signaling link 133. SIP signaling system 122 and access network 112 communicate over signaling link 134. Access network 112 and communication device 102 communicate over signaling link 135. Signaling links 131-135 might be wireless communication links, fiber/coax communication links, satellite communication links, and/or some other communication media. Portions of signaling links 131-135 may traverse portions of communication interface 113 and data bearers 141-142. In addition, one or more signaling links 131-135 may be virtual links between virtual machines that are running on an NFV server system.

In the following discussion, signaling messages are enumerated with the same reference numerals as the signaling links that they traverse. For example, a SIP message that traverses signaling links 131-132 is referred to as SIP message 131/132. Note that additional signaling occurs in a supporting and contemporaneous manner to that described herein to implement data bearers, but for clarity, the discussion focuses on innovative aspects of the signaling.

Communication system 100 exchanges SIP signaling to establish, request, and report hardware trust. Communication system 100 exchanges SIP signaling having hardware trust requirements to indicate that only trusted hardware should be used for the communication path. This hardware trust data could be described in a separate SIP trust header contained in various SIP messages, such as: REGISTRATION, INVITE, ACK, CANCEL, BYE, OPTIONS, REFER, and Provisional Acknowledgement (PRACK). The hardware trust data could also be noted through a trust code or flag located in another SIP header, and then specific hardware trust data and requirements could be specified in the accompanying Session Description Protocol (SDP) file.

Server system 121 exchanges trust signaling 132 with access network 111 and responsively establishes hardware trust with access network 111. The trust signaling uses Diameter, SIP, or some other data communication protocol. Server system 121 typically establishes hardware trust with one or more network elements in access network 111 that have trust software modules. The trust software modules assert physical control over data access to network element hardware, such as microprocessors, bus interfaces, memories, communication ports, and the like. The trust software modules direct the hardware to read secret keys physically embedded in the hardware itself, such as a code stored in non-volatile read-only circuit. The trust software modules transfer encoded versions of the secret keys to server system 121 to maintain hardware trust.

For example, server system 121 might repeatedly transfer random numbers to a network element in access network 111. The trust module in the network element would perform a one-way hash on the random numbers with its secret key and return the hash results to server system 121. Server system 121 then compares the received hash results to its own self-generated hash results to verify the hardware trust of the network element. The trusted network element could then be used as a trust proxy to establish and maintain trust with other network elements in access network 111 and report this hardware trust to server system 121.

Server system 121 exchanges SIP signaling 133 with SIP signaling system 122 and responsively establishes hardware trust with SIP signaling system 122. The SIP signaling could be for REGISTRATION, OPTIONS, or PRACK. Server system 121 typically establishes hardware trust with SIP servers in SIP signaling system 122 that have trust software modules. The trust software modules assert physical control over data access to SIP server hardware, such as microprocessors, bus interfaces, memories, communication ports, and the like. The trust software modules direct the hardware to read secret keys physically embedded in the hardware itself, such as a code stored in non-volatile read-only circuit. The trust software modules transfer encoded versions of the secret keys to server system 121 to maintain hardware trust.

Server system 121 could repeatedly transfer random numbers to an IMS server in SIP signaling system 122. The trust module in the IMS server would perform a one-way hash on the random numbers with its secret key and return the hash results to server system 121. Server system 121 then compares the received hash results to its own self-generated hash results to verify the hardware trust of the IMS server. The trusted IMS server could then be used as a trust proxy to establish and maintain trust with other SIP servers in SIP signaling system 122 and report this hardware trust to server system 121.

Access networks 111-112 typically perform hardware trust verification with communication interface 113. Server system 121 exchanges trust signaling 132 with access network 111 and responsively determines that access network 111 has established hardware trust with communication interface 113 to access network 112. Thus, access network 111 is a trust proxy for communication interface 113.

SIP signaling system 122 typically performs hardware trust verification with access network 112. Server system 121 exchanges SIP signaling 133 with SIP signaling system 122 and responsively determines that SIP signaling system 122 has established hardware trust with access network 112. The SIP signaling could be for REGISTRATION, OPTIONS, or PRACK. Thus, SIP signaling system 122 is a trust proxy for access network 112.

SIP signaling system 122 typically performs hardware trust verification with communication device 102. Server system 121 exchanges SIP signaling 133 with SIP signaling system 122 and responsively determines that SIP signaling system 122 has established hardware trust with communication device 102. The SIP signaling could be for REGISTRATION, OPTIONS, or PRACK. Thus, SIP signaling system 122 is a trust proxy for communication device 102.

Server system 121 exchanges SIP signaling 131/132 with communication device 101 and responsively establishes hardware trust with communication device 101. The SIP signaling is typically SIP Registration signaling. Server system 121 typically establishes hardware trust with circuitry in communication device 101 that processes a trust software module. The trust software module asserts physical control over data access to device 101 hardware, such as microprocessors, bus interfaces, memories, communication ports, and the like. The trust software module directs the device hardware to read a secret key physically embedded in the hardware. The trust software module transfers encoded versions of the secret key to server system 121 to maintain hardware trust. Server system 121 might repeatedly transfer random numbers to a microprocessor core in communication device 101. The trust module executing in the microprocessor core would perform a one-way hash on the random numbers with the microprocessor core's secret key and return the hash results to server system 121. Server system 121 then compares the received hash results to its own self-generated hash results to verify the hardware trust of the microprocessor core. The trusted microprocessor core could then be used as a trust proxy to establish and maintain trust with other components in communication device 101 and report this hardware trust to server system 121.

Server system 121 receives SIP Invite 131/132 from communication device 101 over access network 111. SIP Invite 131/132 requests a media communication session between communication device 101 and communication device 102 over trusted hardware systems. One or more hardware trust requirements may be included in a Session Description Protocol (SDP) file in SIP Invite 131/132. In some examples, SIP Invite 131/132 includes NFV requirements, such as an ordered list of required NFV time-slices (or network IDs associated with the NFV time-slices). Server system 121 processes standard networking data to determine that communication device 101 can exchange data communications with communications device 102 from end-to-end over access networks 111-112 and communication interface 113.

In response to the trusted hardware requirement in SIP Invite 131/132, server system 121 processes signaling data records to determine that system 121 currently has established hardware trust with communication device 101 and access network 111. Server system 121 also processes signaling data records to determine that trusted access network 111 currently has established hardware trust with communication interface 113. Server system 121 processes signaling data records to determine that trusted SIP signaling system 122 currently has established hardware trust with access network 112 and with communication device 102. Server system 121 may process signaling data records to determine that trusted access network 112 currently has established hardware trust with communication interface 113.

Based on this hardware trust of the end-to-end communication path, server system 121 responsively transfers SIP Invite 133/134/135 for the communication session to communication device 102 over SIP signaling system 122 and access network 112. One or more hardware trust requirements may be included in an SDP file in SIP Invite 133/134/135. In some examples, server system 121 also verifies that proper NFV time slices are available for the communication session before forwarding SIP Invite 133/134/135.

Server system 121 may then receive SIP OK 133/134/135 from communication device 102 over access network 112 and SIP signaling system 122. Server system 121 responsively transfers a communication request to access network 111 to establish a data link from communication device 101 to access network 112 over the trusted hardware. For example, a Proxy Call State Control Function (P-CSCF) in server system 121 could transfer a Diameter message to a Policy Charging and Rules Function (PCRF) in the access network 111 to establish a live-video data bearer 141 between communication device 101 and communication interface 113 during a specific NFV time-slice.

Referring to FIG. 2, an exemplary operation of communication system 100 is described. Server system 121 exchanges trust signaling with access network 111 (201). Server system 121 establishes hardware trust with access network 111 and determines that access network 111 has established hardware trust with communication interface 113 to access network 112. Server system 121 exchanges Session Initiation Protocol (SIP) signaling with SIP system 122 (202). Server system 121 establishes hardware trust with SIP system 122. Server system 121 determines that SIP system 122 has established hardware trust with access network 112 and communication device 102. Server system 121 exchanges SIP signaling with communication device 101 and establishes hardware trust with communication device 101 (203).

Server system 121 receives a SIP Invite requesting a communication session between communication device 101 and communication device 102 over trusted hardware systems, and based on the established hardware trust, server system 121 responsively forwards the SIP Invite to SIP system 122 for delivery to communication device 102 (204). Note that if the end-to-end communication path has current hardware trust, then server system 121 forwards the SIP Invite having the hardware trust requirement. If the end-to-end communication path does not have current hardware trust, then server system 121 does not forward the SIP Invite having the hardware trust requirement—although server system 121 may take remedial measures.

If communication device 102 has not yet established trust, then server system 121 may send a different SIP message (possibly a modified Invite) to SIP signaling system 122 that requests the establishment and reporting of hardware trust with communication device 102. Once this hardware trust is reported, then server system 121 forwards the SIP Invite for the communication session to SIP system 122 for delivery to communication device 102. Likewise, if access network 112 has not yet established trust, then server system 121 may send a different SIP message (possibly a modified Invite) to SIP signaling system 122 to establish and report hardware trust with access network 112. Once this hardware trust is reported, then server system 121 forwards the SIP Invite for the communication session to SIP system 122 for delivery to communication device 102. These hardware trust requests and reports could be transported in a SIP trust header, data flag in another SIP header, and/or information in an SDP file.

Referring to FIG. 3, an exemplary Network Function Virtualization (NFV) configuration and operation of communication system 100 is described, although system 100 may vary from this specific NFV example. In this NFV example, access networks 111-112 are coupled through communication interface 113 that comprises virtual machine gateways and links that run on a shared and trusted NFV server system. For example, portions of access network 111 and access network 112 may run on the same NFV server during different NFV time slices.

In this example, communication system 100 exchanges SIP signaling to establish, request, and report NFV data. Communication system 100 exchanges SIP signaling having NFV requirements that indicate NFV time slices that should be used for the communication path. This NFV data could be described in a separate SIP NFV header contained in various SIP messages, such as: REGISTRATION, INVITE, ACK, CANCEL, BYE, OPTIONS, REFER, and Provisional Acknowledgement (PRACK). The NFV data could also be noted through an NFV code or flag located in another SIP header, and then specific NFV data and requirements could be specified in the accompanying Session Description Protocol (SDP) file.

In operation, access networks 111-112 exchange trust signaling to establish hardware trust with one another. For example, trust software in access networks 111-112 direct their respective hardware to read their hardware keys and transfer hashed products of their hardware keys. The trust software in access networks 111-112 then direct their hardware to compare the received hash products to their self-generated hash products to verify hardware trust of one another.

Access network 111 and communication device 101 exchange trust and NFV signaling. The trust signaling establishes hardware trust between device 101 and network 111. The NFV signaling indicates NFV data like available NFV time-slices and their corresponding characteristics. For example, the NFV signaling may indicate that NFV network "X27" should be used for sensitive SIP-based communications. Access network 112 and communication device 102 exchange trust signaling to establish hardware trust with one another. Access network 112 and communication device 102 exchange NFV signaling to indicate NFV data.

Access network 111 and server system 121 exchange SIP Registration signaling to establish hardware trust with one another, report NFV data for device 101 and network 111, report the hardware trust between access networks 111-112, and report the hardware trust between access network 111 and communication device 101. Access network 112 and SIP system 122 exchange SIP Registration signaling to establish hardware trust with one another, report NFV data for device 102 and network 112, report the hardware trust between access networks 111-112, and report the hardware trust between access network 112 and communication device 102.

Server system 121 and communication device 101 exchange SIP Registration signaling to establish hardware trust with one another, report NFV data for device 101 and network 111, and report the hardware trust between access network 111 and communication device 101. SIP system 122 and communication device 102 exchange SIP Registration signaling to establish hardware trust with one another, report NFV data for device 102 and network 112, and report the hardware trust between access network 112 and communication device 102.

Server system 121 and SIP system 122 exchange SIP Registration signaling to establish hardware trust with one another, report NFV data for devices 101-102 and networks 111-112, and report the hardware trust between access network 111 and communication device 101, access network 111 and server system 121, access network 111 and access network 112, access network 112 and communication device 102, access network 112 and SIP system 122, server system 121 and communication device 101, and SIP system 122 and communication device 102.

Server system 121 sorts and associates the trust data and the NFV data for subsequent SIP Invite processing. Server system 121 subsequently receives a SIP Invite for a communication session between communication device 101 and communication device 102 having a hardware trust requirement and an NFV time-slice requirement. The hardware trust requirement could be denoted by a separate SIP trust header, trust data flag in another SIP header, and/or trust information in an SDP file. Likewise, the NFV time-slice requirement could be denoted by a separate SIP NFV header, NFV data flag in another SIP header, and/or NFV information in an SDP file.

Server system 121 processes networking data to determine that communication devices 101-102 can exchange data communications over access networks 111-112. Server system 121 processes the hardware trust requirement and the associated signaling data to determine that the data communication path formed by communication devices 101-102 and access networks 111-112 currently has end-to-end hardware trust. Server system 121 processes the NFV time-slice requirement and the associated NFV signaling data to determine that the data communication path formed by communication devices 101-102 and access networks 111-112 currently uses accepted NFV time slices. For example, the time slice requirement in the SIP Invite may indicate that only NFV time-slices with a specified hardware-trust rating be used, and based on the NFV data, server system 121 could verify that the data path uses NFV time-slices having the specified hardware-trust rating.

Based on the hardware trust and NFV requirements as compared to the current hardware trust and NFV time-slices for the end-to-end communication path, server system 121 transfers the SIP Invite with the hardware trust and NFV time-slice requirements to SIP system 122. Based on the hardware trust requirement and the NFV time-slice requirement as compared to its own trust and NFV data records, SIP system 122 transfers the SIP Invite with the hardware trust and NFV time-slice requirements to communication device 102.

SIP system 122 receives a SIP OK having hardware trust and NFV time-slice requirements from communication device 102 and transfers the SIP OK to server system 121. Responsive to the SIP OK with the hardware trust and NFV time-slice requirements, SIP system 122 transfers a communication request to access network 112 to establish a data bearer from communication device 102 to access network 111 over trusted hardware and using the proper NFV time-slice. Access network 112 confirms the trusted data bearer and proper NFV time-slice with communication device 102.

Server system 121 receives the SIP OK having the hardware trust NFV time-slice requirements from SIP system 122 and transfers the SIP OK to communication device 101. Responsive to the SIP OK with the hardware trust NFV time-slice requirements, server system 121 transfers a communication request to access network 111 to establish a trusted data bearer from communication device 101 to access network 112 using the appropriate NFV time-slice. Access network 111 confirms the trusted data bearer and NFV time-slice with communication device 101. Communication device 101 and communication device 102 then exchange data communications from end-to-end over access networks 111-112 using trusted hardware and proper NFV time-slices.

Note that server system 121 forwards the SIP Invite having the hardware trust and NFV time-slice requirements to communication device 102 only if the end-to-end communication path has the current hardware trust and uses the proper NFV time-slices. If the end-to-end communication path does not have current hardware trust, then server system 121 may take remedial measures not shown on FIG. 3. For example, if communication device 102 has not yet established trust, then server system 121 may send a SIP message (possibly a modified Invite) that requests trusted SIP system 122 to establish and report hardware trust with communication device 102. Once this hardware trust is reported by SIP system 122, then server system 121 forwards the SIP Invite for the communication session between devices 101-102 to SIP system 122 for delivery to communication device 102. Likewise, if access network 112 has not yet established trust, then server system 121 may send a SIP message (possibly a modified Invite) to SIP signaling system 122 to establish and report hardware trust with access network 112. Once this hardware trust is reported, then server system 121 forwards the SIP Invite for the communication session to SIP system 122 for delivery to communication device 102. These hardware trust requests, establishments, and reports are transported in SIP trust headers, other SIP headers, and/or SDP files.

If the end-to-end communication path uses an improper NFV time-slice, then server system 121 may take remedial measures not shown on FIG. 3. For example, server system 121 may send an NFV message to access network 111 to enable particular types of NFV time slices (or network IDs) for communication device 101. Server system 121 may send a SIP message to SIP system 122 to direct access network 112 to enable particular types of NFV time slices for communication device 102. Once the corrected NFV timeslice data is reported by access network 111 and/or SIP system 122, then server system 121 forwards the SIP Invite for the communication session between devices 101-102 to SIP system 122 for delivery to communication device 102. These NFV requests, establishments, and reports are transported in SIP NFV headers, other SIP headers, and/or SDP files.

Figure 4:
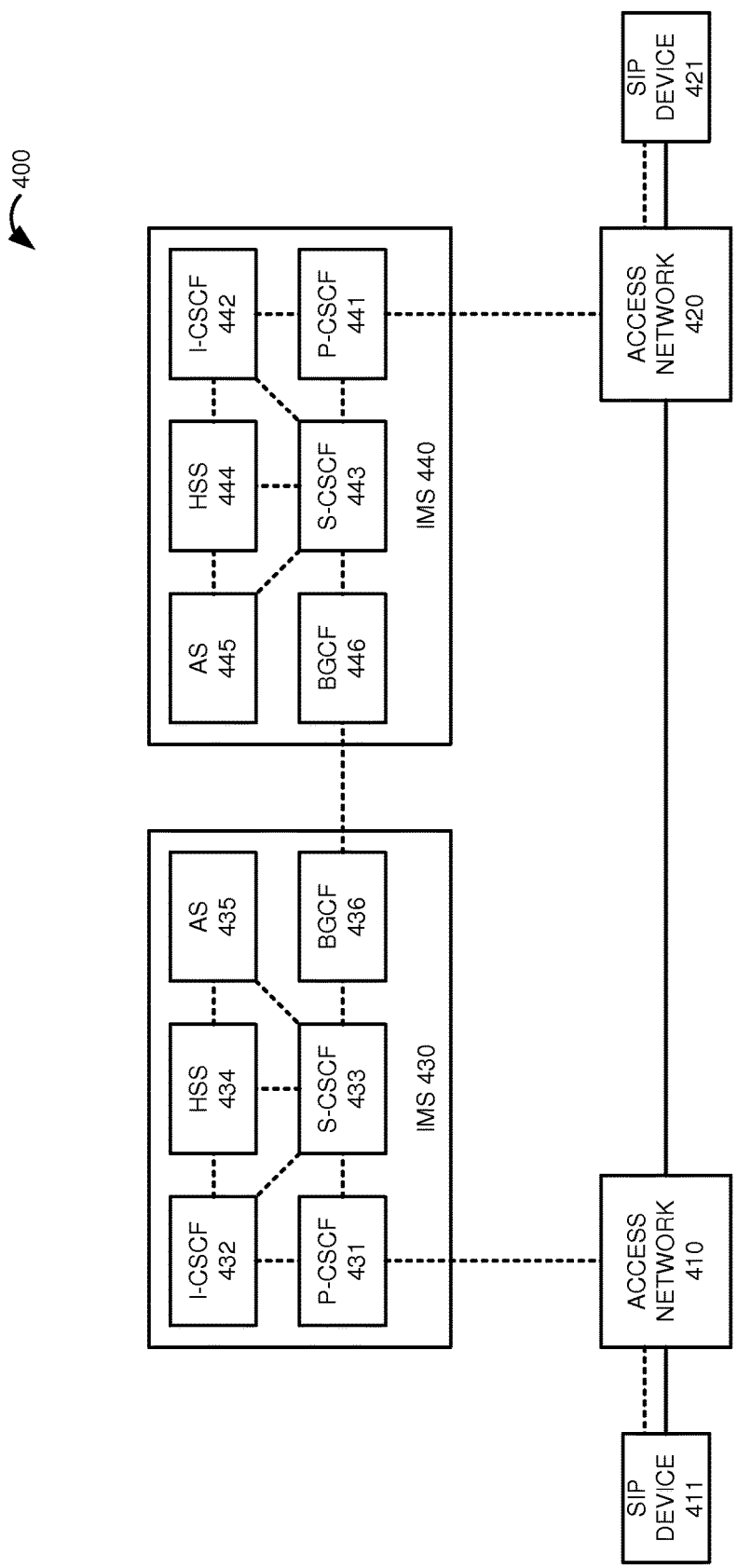
FIG. 4 illustrates an Internet Multimedia Subsystem (IMS) to control data communication sessions over trusted hardware between Session Initiation Protocol (SIP) communication devices.

FIG. 4 illustrates communication system 400 having Internet Multimedia Subsystem (IMS) 430 and IMS 440 to control data communication sessions over trusted hardware between Session Initiation Protocol (SIP) communication devices 411 and 421. Communication system 400 is an example of communication system 100, although system 100 may vary from the specific details of this example. IMS 430 includes Proxy Call State Control Function (P-CSCF) 431, Interrogating CSCF (I-CSCF) 432, Serving CSCF (S-CSCF) 433, Home Subscriber System (HSS) 434, Application Server (AS) 435, and Border Gateway Control Function (BGCF) 436. IMS 440 includes P-CSCF 441, I-CSCF 442, S-CSCF 443, HSS 444, AS 445, and BGCF 446.

In operation, access networks 410 and 420 exchange SIP Registration signaling to establish hardware trust with one another and with their shared communication interface. Access network 410 and SIP device 411 exchange SIP Registration signaling to establish hardware trust with one another. Access network 420 and SIP device 421 exchange SIP Registration signaling to establish hardware trust with one another.

Access network 410 and Proxy Call State Control Function (P-CSCF) 431 in IMS 430 exchange SIP Registration signaling to establish hardware trust with one another. Access network 410 and P-CSCF 431 exchange SIP Registration signaling to report the hardware trust between access networks 410 and 420 and between access network 410 and SIP device 411. P-CSCF 431 transfers the trust data for association and use in Home Subscriber System (HSS) 434 and Application Server (AS) 435.

Access network 420 and P-CSCF 441 in IMS 440 exchange SIP Registration signaling to establish hardware trust with one another. Access network 420 and P-CSCF 441 exchange SIP Registration signaling to report the hardware trust between access networks 420 and 410 and between access network 420 and SIP device 421. P-CSCF 441 transfers the trust data for association and use in HSS 444 and AS 445.

S-CSCF 433 in IMS 430 and SIP device 411 exchange SIP Registration messages to establish hardware trust with one another and to report the hardware trust between SIP device 411 and access network 410. S-CSCF 443 in IMS 440 and SIP device 421 exchange SIP Registration messages to establish hardware trust with one another and to report the hardware trust between SIP device 421 and access network 420. S-CSCF 433 transfers the trust data for association and use in HSS 434 and AS 435. S-CSCF 443 transfers the trust data for association and use in HSS 444 and AS 445.

BGCF 436 in IMS 430 and BGCF 446 in IMS 440 exchange SIP Registration messages to establish hardware trust with one another. BGCF 436 and BGCF 446 exchange SIP Registration messages to report the hardware trust between: access network 410 and SIP device 411, access network 410 and IMS 430, access network 410 and access network 420, access network 420 and SIP device 421, access network 420 and IMS 440, IMS 430 and SIP device 411, and IMS 440 and SIP device 421. BGCF 436 transfers the trust data for association and use in HSS 434 and AS 435. BGCF 446 transfers the trust data for association and use in HSS 444 and AS 445.

SIP device 411 transfers a SIP Invite to P-CSCF 431 for a media session between SIP devices 411 and 421. The SIP Invite has a hardware trust header requiring data bearers over trusted hardware, and additional trust requirements are specified in an attached SDP file. P-CSCF 431 forwards the SIP Invite to I-CSCF 432—which forwards the Invite to S-CSCF 433. Based on the SIP trust header, S-CSCF 433 forwards the SIP Invite to AS 435. AS 435 determines that SIP device 411 and SIP device 421 can exchange data communications over an end-to-end communication path formed by: SIP device 411, access network 410, access network 420, and SIP device 421. AS 435 accesses HSS 434 to determine the current trust status for SIP devices 411 and 420 and access networks 410 and 420. Since the end-to-end communication path has current hardware trust, AS 435 directs S-CSCF 433 to forward the SIP Invite with the hardware trust header through BGCFs 436 and 446 to S-CSCF 443 in IMS 440.

Based on the SIP trust header, S-CSCF 443 forwards the SIP Invite to AS 445. AS 445 determines that SIP device 411 and SIP device 421 can exchange data communications over an end-to-end communication path formed by: SIP device 411, access network 410, access network 420, and SIP device 421. AS 445 accesses HSS 444 to determine the current trust status for SIP devices 411 and 420 and access networks 410 and 420. Since the end-to-end communication path has current hardware trust, AS 445 directs S-CSCF 443 to forward the SIP Invite with the hardware trust header to SIP device 421 through I-CSCF 442, P-CSCF 441, and access network 420.

SIP device 421 processes the SIP Invite having the hardware trust header and SDP trust data to generate a corresponding SIP OK message. The SIP OK also has a hardware trust header and SDP trust data. For example, the SDP data may indicate the trust protocol version being used to generate and process the trust data. SIP device 421 may indicate that it uses a different but compatible version of the hardware trust protocol. SIP device 421 transfers the SIP OK back through the proxy signaling channel back to SIP device 411 through elements 420-441-442-443-445-446-436-433-435-432-431-410.

Responsive to the SIP OK, AS 445 directs S-CSCF 443 to transfer a communication request through P-CSCF 441 to access network 441 to establish a data bearer from SIP device 421 to access network 410 over trusted hardware. Access network 420 confirms the trusted data bearer with SIP device 421. Responsive to the SIP OK, AS 435 directs S-CSCF 433 to transfer a communication request through P-CSCF 431 to access network 410 to establish a data bearer from SIP device 411 to access network 420 over trusted hardware. Access network 410 confirms the trusted data bearer with SIP device 411. SIP devices 411 and 421 then exchange data communications using trusted hardware from end-to-end over access networks 410 and 420.

Note that AS 435 forwards the SIP Invite having the hardware trust header only if the end-to-end communication path has current hardware trust. If the end-to-end communication path does not have current hardware trust, then AS 435 takes remedial measures. If SIP device 421 has not yet established its hardware trust, then AS 435 sends a SIP message to AS 445 through S-CSCF 433, BGCF 436, BGCF 446, and S-CSCF 443. The SIP message requests IMS 440 to establish and report hardware trust with SIP device 421. Once this hardware trust is reported back to AS 435, then AS 435 directs S-CSCF 433 to forward the SIP Invite for the communication session between devices 411 and 421 to IMS 440 for delivery to SIP device 421. If access network 420 has not yet established its hardware trust, then AS 435 sends a SIP message to AS 445 through S-CSCF 433, BGCF 436, BGCF 446, and S-CSCF 443. The SIP message requests IMS 440 to establish and report hardware trust with access network 420. Once this hardware trust is reported back to AS 435, then AS 435 directs S-CSCF 433 to forward the SIP Invite for the communication session between devices 411 and 421 to IMS 440 for delivery to SIP device 421. The hardware trust request, establishment, and report data are transported in SIP trust headers.

Figure 5:
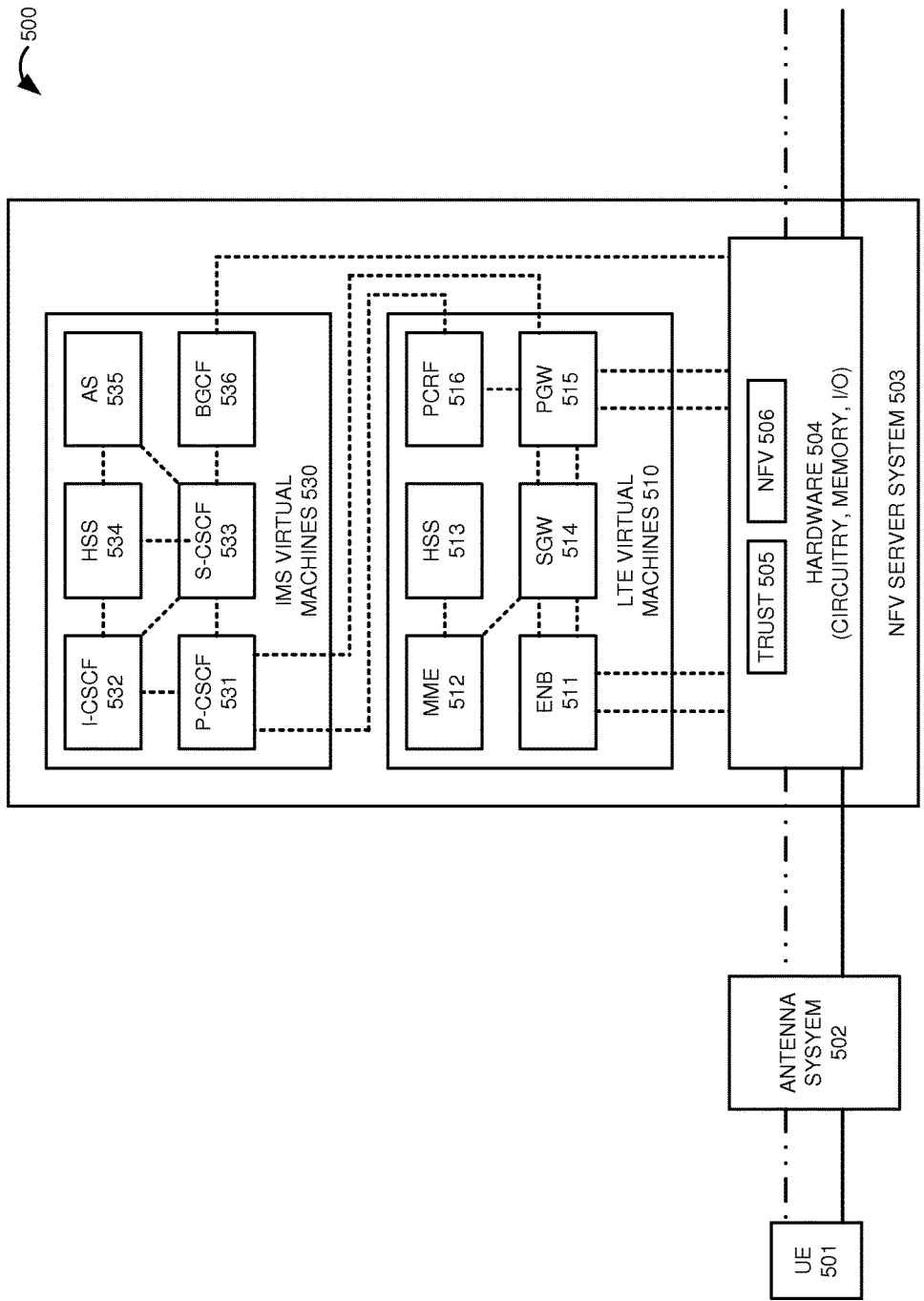
FIG. 5 illustrates a Network Function Virtualization (NFV) communication system having a Long Term Evolution (LTE) network and an Internet Multimedia Subsystem (IMS) to establish data bearers over trusted hardware and proper NFV time-slices for LTE User Equipment (UE).

FIG. 5 illustrates Network Function Virtualization (NFV) communication system 500 to establish data bearers over trusted hardware during proper NFV time slices for LTE User Equipment (UE) 501. NFV communication system 500 is an example of communication systems 100 and 400, although systems 100 and 400 may vary from the specific details of this example. NFV communication system 500 comprises UE 501, antenna system 502, and NFV server system 503. NFV server system 503 comprises hardware 504, LTE virtual machines 510, and IMS virtual machines 530. Hardware 504 comprises data processing circuitry, memory devices, and Input/Output (I/O) communication interfaces. Hardware 504 includes trust system 505 and NFV system 506.

Trust system 505 comprises trust software and portions of hardware 504 to control access to and provide remote hardware verification for hardware 504. NFV system 506 comprises hypervisor software and portions of hardware 504 to execute virtual machines 510 and 530 in various NFV time slices. LTE virtual machines 510 include eNodeB 511, Mobility Management Entity (MME) 512, Home Subscriber System (HSS) 513, Serving Gateway (S-GW) 514, Packet Data Network Gateway (P-GW) 515, and Policy Charging and Rules Function (PCRF) 516. IMS virtual machines 530 include P-CSCF 531, I-CSCF 532, S-CSCF 533, HSS 534, AS 535, and BGCF 536.

Hardware trust is first established across system 500. AS 535 directs S-CSCF 533 to exchange SIP signaling with another IMS through BGCF 536 to establish hardware trust and discover any access networks and UEs that are trusted by the trusted IMS. P-GW 515 exchanges LTE signaling to establish hardware trust with S-GW 514, and SGW 514 exchanges LTE signaling to establish hardware trust with eNodeB 511. eNodeB 511 exchanges LTE signaling to establish hardware trust with antenna system 502. P-GW 515 also exchanges LTE signaling to establish hardware trust with another access network.

NFV system 506 collects NFV data for virtual machines 510 and 530 indicating their NVF time slices and the characteristics of the time slices. For example, the NFV time slices may be classified by trust level, cost level, Virtual Private Network ID, Access Point Name, domain name, and the like. NFV system 506 collects NFV data for UE 501 indicating proper NVF time slices characteristics for UE 501.

UE 501 attaches to eNodeB 511, and MME 512 exchanges Non-Access Stratum (NAS) information with UE 501 to establish hardware trust of UE 501 and to exchange NFV data. MME 512 retrieves an IMS APN from HSS 513 for UE 501 where the APN uses hardware trust verifications and NFV time-slices that are suitable for UE 501. MME 512 implements an IMS signaling bearer for trusted UE 501 to P-CSCF 531 through P-GW 515.

AS 535 directs S-CSCF 533 to exchange SIP signaling through P-CSCF 531 with P-GW 515 to establish hardware trust and gather NFV data. AS 535 also directs S-CSCF 533 to exchange SIP signaling through P-CSCF 531 with P-GW 515 to discover the hardware trust and NFV data for UE 501 and other LTE virtual machines 510. AS 535 associates the resulting trust and NFV data in HSS 534. S-CSCF 533 and UE 501 exchange SIP Registration messages to establish hardware trust with one another and to report the NFV data and hardware trust for UE 501 and LTE virtual machines 510. S-CSCF 533 transfers the trust and NFV data for association and use in HSS 534 and AS 535.

UE 501 transfers a SIP Invite over the IMS bearer through LTE virtual machines 510 to P-CSCF 531. The SIP Invite is for a media session between UE 501 and another device (not shown). The SIP Invite has a hardware trust header requiring data bearers over trusted hardware, and additional trust requirements are specified in an attached SDP file. The SIP Invite also has an NFV header requiring data bearers during particular NFV slices, and additional NFV requirements are specified in the attached SDP file. P-CSCF 531 forwards the SIP Invite to S-CSCF 533 through I-CSCF 532. Based on the SIP trust header and/or the NFV header, S-CSCF 533 forwards the SIP Invite to AS 535.

AS 535 determines that UE 501 and the other device can exchange data communications over an end-to-end communication path including UE 501, antenna system 502, NFV server system 503, the other access network, and the other communication device. AS 535 accesses HSS 434 to determine the current trust status for UE 501, antenna system 502, and, NFV server system 503. AS 535 accesses HSS 434 to determine the current NFV time-slices for LTE virtual machines 510 and IMS virtual machines 530 that support the communication path.

AS 535 may access HSS 534 or query the other IMS to determine the current trust and NFV status for the other communication device and the other access network. Since the end-to-end communication path has current hardware trust and uses proper NFV time-slices, AS 535 directs S-CSCF 533 to forward the SIP Invite with the hardware trust header and NFV header through BGCF 536 to the other IMS and on to the other device.

The other communication device responds with a SIP OK for the communication session that is transferred to AS 535 through BGCF 536 and S-CSCF 533. Responsive to the SIP OK, AS 535 directs S-CSCF 533 to transfer a communication request through P-CSCF 531 to PCRF 516 to establish a data bearer from UE 501 to the other access network over trusted hardware and during proper NFV time-slices. PCRF 516 transfers the data bearer request to P-GW 515 along with pertinent APN and Quality-of-Service (QoS) data. PGW 515 sends LTE create bearer signaling to S-GW 514, and S-GW 514 sends LTE create bearer signaling to MME 512. MME 512 sends LTE create bearer signaling to eNodeB 511 which establishes a data bearer to UE 501. UE 501 then exchanges data communications over communication system 500 responsive to SIP signaling and using trusted hardware and proper NFV slices.

Figure 6:
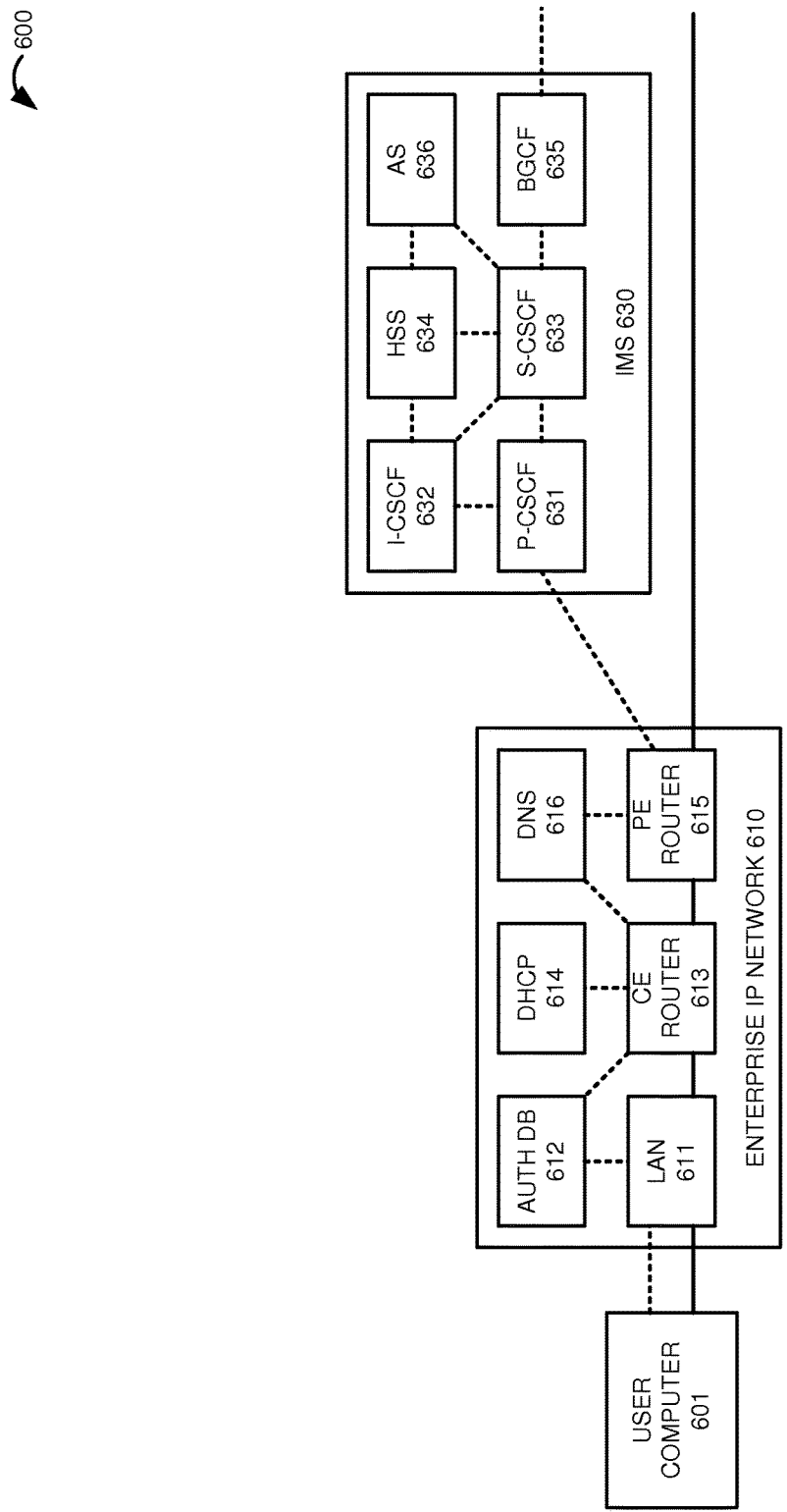
FIG. 6 illustrates an Enterprise Internet Protocol (IP) network and an Internet Multimedia Subsystem (IMS) to establish data bearers over trusted hardware for user computers.

FIG. 6 illustrates Enterprise Internet Protocol (IP) network 610 and an Internet Multimedia Subsystem (IMS) to establish data bearers over trusted hardware for user computers. Communication system 600 is an example of communication systems 100 and 400, although systems 100 and 400 may vary from the specific details of this example. IP network 610 includes Local Area Network (LAN) 611, Authorization database 612, Customer Edge (CE) router 613, Dynamic Host Control Protocol (DHCP) server 614, Provider Edge (PE) router 615, Domain Name Service (DNS) server 616. IMS 630 includes P-CSCF 631, I-CSCF 632, S-CSCF 633, HSS 634, AS 635, and BGCF 636.

Hardware trust is first established across system 600. AS 635 directs S-CSCF 633 to exchange SIP signaling with another IMS through BGCF 636 to establish hardware trust and discover any access networks and UEs that are trusted by the trusted IMS. PE router 615 exchanges trust signaling to establish hardware trust with CE router 613. CE router 613 exchanges trust signaling to establish hardware trust with LAN 611. LAN 611 exchanges trust signaling to establish hardware trust with user computer 601. PE router 615 also exchanges trust signaling to establish hardware trust with another PE router for another enterprise IP network.

AS 635 directs S-CSCF 633 to exchange SIP signaling through P-CSCF 631 with PE router 615 to establish hardware trust. AS 635 also directs S-CSCF 633 to exchange SIP signaling through P-CSCF 631 with PE router 615 to discover the hardware trust of user computer 601 and IP network 610. AS 635 associates the resulting trust data in HSS 634.

User computer 601 obtains access to IP network 612 from authorization database 612. User computer 601 obtains an origination IP address from DHCP server 614. User computer 601 resolves a destination name to a destination IP address through DNS server 616. User computer 603 and S-CSCF 633 exchange SIP Registration messages to establish hardware trust with one another and to report the hardware trust between user computer 601 and IP network 610. S-CSCF 633 transfers the trust data for association and use in HSS 634 and AS 635.

User computer 601 transfers a SIP Invite over IP network 610 to P-CSCF 631 in IMS 630. The SIP Invite is for a media session between user computer 601 and a remote server device (not shown). The SIP Invite has a hardware trust header requiring data bearers over trusted hardware, and additional trust requirements are specified in an attached SDP file. P-CSCF 631 forwards the SIP Invite to S-CSCF 633 through I-CSCF 632. Based on the SIP trust header, S-CSCF 633 forwards the SIP Invite to AS 635.

AS 635 determines that user computer 601 and the remote server can exchange data communications over an end-to-end communication path including user computer 601 and IP network 630, the other access network, and the remote server. AS 635 accesses HSS 634 to determine the current trust status for user computer 601 and IP network 610. AS 635 may access HSS 634 or query the other IMS to determine the current trust status for the remote server and the other access network. Since the end-to-end communication path currently has hardware trust, AS 635 directs S-CSCF 633 to forward the SIP Invite with the hardware trust header through BGCF 636 to the other IMS and on to the remote server.

The remote server responds with a SIP OK for the communication session that is transferred to AS 635 through BGCF 636 and S-CSCF 633. Responsive to the SIP OK, AS 635 directs S-CSCF 633 to transfer a communication request through P-CSCF 631 to PE router 631 to allow a data bearer from user computer 601 to the other access network over trusted hardware. User computer 601 then exchanges data communications over IP network 610 responsive to SIP signaling and using trusted hardware.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a server system to process Session Initiation Protocol (SIP) signaling to facilitate the transfer of data communications over trusted hardware, the method comprising: a server system exchanging trust signaling with a first access network and responsively establishing hardware trust with the first access network and responsively determining that the first access network has established hardware trust with a communication interface to a second access network;

the server system exchanging SIP signaling with a SIP system and responsively establishing hardware trust with the SIP system and responsively determining that the SIP system has established hardware trust with the second access network and with a second communication device;

the server system exchanging SIP signaling with a first communication device and responsively establishing hardware trust with the first communication device;

the server system receiving a SIP Invite requesting a communication session between the first communication device and the second communication device over hardware-trusted systems, and based on the hardware trust with the first communication device, the first access network, the communication interface, the second access network, and the second communication device, the server system responsively forwarding the SIP Invite to the SIP signaling system for delivery to the second communication device, the server system exchanging Network Function Virtualization (NFV) signaling with the first access network indicating NFV time slice data for the first access network;

the server system exchanging SIP signaling with the SIP system indicating NFV time slice data for the second access network; and the server system receiving the SIP Invite requesting the communication session having an NFV time slice requirement, and further based on the NFV time slice data for the first access network and the second access network, responsively forwarding the SIP Invite to the SIP signaling system for delivery to the second communication device.

2. The method of claim 1 further comprising the server system receiving a SIP OK from the second communication device and responsively transferring a communication request to the first access network to establish a data link from the first communication device to the second access network over the trusted hardware.

3. The method of claim 1 further comprising the server system receiving a SIP OK from the second communication device and responsively transferring a Diameter message to a Policy Charging and Rules Function (PCRF) in the first access network to establish a data link from the first communication device to the second access network over the trusted hardware.

4. The method of claim 1 wherein the server system exchanging the trust signaling with the first access network to establish the hardware trust comprises a Proxy Call State Control Function (P-CSCF) exchanging SIP Registration signaling with a Packet Data Network Gateway (P-GW) to establish hardware trust.

5. The method of claim 1 wherein the server system exchanging the SIP signaling with the first communication device to establish the hardware trust comprises exchanging SIP Registration messaging with the first communication device to establish hardware trust.

6. The method of claim 1 wherein the server system exchanging SIP signaling with the SIP system to establish the hardware trust comprises a Border Gateway Control Function (BGCF) in the server system exchanging SIP Registration messaging with a BGCF in the SIP system to establish hardware trust.

7. The method of claim 1 wherein the server system receiving the SIP Invite comprises the server system receiving a Session Description Protocol (SDP) file having a hardware trust requirement to request the hardware-trusted systems.

8. The method of claim 1 further comprising:
the server system exchanging Network Function Virtualization (NFV) signaling with the first access network indicating NFV time slice data for the first access network;
the server system exchanging SIP signaling with the first communication device indicating NFV time slice data for the first communication device; and
the server system receiving the SIP Invite requesting the communication session having an NFV time slice requirement, and further based on the NFV time slice data for the first communication device network and the first access network, responsively forwarding the SIP Invite to the SIP signaling system for delivery to the second communication device.

9. The method of claim 1 further comprising:
the server system exchanging Network Function Virtualization (NFV) signaling with the first access network indicating NFV time slice data for the first access network;
the server system exchanging SIP signaling with the SIP system indicating NFV time slice data for the second access network and the second communication device; and
the server system exchanging SIP signaling with the first communication device indicating NFV time slice data for the first communication device; and
the server system receiving the SIP Invite requesting the communication session having an NFV time slice requirement, and further based on the NFV time slice data for the first communication device, the first access network, the second access network, and the second communication device, responsively forwarding the SIP Invite to the SIP signaling system for delivery to the second communication device.

10. A communication system to process Session Initiation Protocol (SIP) signaling to facilitate the transfer of data communications over trusted hardware, the communication system comprising:
a first access network configured to exchange trust signaling and responsively establish hardware trust with a communication interface to a second access network;
a server system configured to exchange trust signaling with the first access network, establish hardware trust with the first access network, and determine that the first access network has established hardware trust with the communication interface to the second access network;
the server system configured to exchange SIP signaling with a SIP system, establish hardware trust with the SIP system, and determine that the SIP system has established hardware trust with the second access network and with a second communication device;
the server system configured to exchange SIP signaling with a first communication device, establish hardware trust with the first communication device, and receive a SIP Invite requesting a communication session between the first communication device and the second communication device over hardware-trusted systems;
the server system configured, based on the hardware trust with the first communication device, the first access network, the communication interface, the second access network, and the second communication device, to the responsively forward the SIP Invite to the SIP signaling system for delivery to the second communication device,
the server system is further configured to exchange Network Function Virtualization (NFV) signaling with the first access network indicating NFV time slice data for the first access network;
the server system is further configured to exchange SIP signaling with the SIP system indicating NFV time slice data for the second access network; and
the server system is further configured to receive the SIP Invite requesting the communication session having an NFV time slice requirement, and further based on the NFV time slice data for the first access network and the second access network, responsively forward the SIP Invite to the SIP signaling system for delivery to the second communication device.

11. The communication system of claim 10 wherein the server system is configured to receive a SIP OK from the second communication device and responsively transfer a communication request to the first access network to establish a data link from the first communication device to the second access network over the trusted hardware.

12. The communication system of claim 10 wherein the server system is configured to receive a SIP OK from the second communication device and responsively transfer a Diameter message to a Policy Charging and Rules Function (PCRF) in the first access network to establish a data link from the first communication device to the second access network over the trusted hardware.

13. The communication system of claim 10 wherein the server system comprises a Proxy Call State Control Function (P-CSCF) configured to exchange SIP Registration signaling with a Packet Data Network Gateway (P-GW) to establish hardware trust.

14. The communication system of claim 10 wherein the server system is configured to exchange SIP Registration signaling with the first communication device to establish the hardware trust.

15. The communication system of claim 10 wherein the server system comprises a Border Gateway Control Function (BGCF) configured to exchange SIP Registration messaging with a BGCF in the SIP system to establish hardware trust.

16. The communication system of claim 10 wherein the server system is configured to receive the SIP Invite having a Session Description Protocol (SDP) file having a hardware trust requirement to request the trusted hardware.

17. The communication system of claim 10 wherein:
the server system is further configured to exchange Network Function Virtualization (NFV) signaling with the first access network indicating NFV time slice data for the first access network;
the server system is further configured to exchange SIP signaling with the first communication device indicating NFV time slice data for the first communication device;
and the server system is further configured to receive the SIP Invite requesting the communication session having an NFV time slice requirement, and further based on the NFV time slice data for the first communication device network and the first access network, responsively forward the SIP Invite to the SIP signaling system for delivery to the second communication device.

18. The communication system of claim 10 wherein:
the server system is further configured to exchange Network Function Virtualization (NFV) signaling with the first access network indicating NFV time slice data for the first access network;
the server system is further configured to exchange SIP signaling with the SIP system indicating NFV time slice data for the second access network and the second communication device; and
the server system is further configured to exchange SIP signaling with the first communication device indicating NFV time slice data for the first communication device;
and the server system is further configured to receive the SIP Invite requesting the communication session having an NFV time slice requirement, and further based on the NFV time slice data for the first communication device, the first access network, second access network, and the second communication device, responsively forward the SIP Invite to the SIP signaling system for delivery to the second communication device.

\* \* \* \* \*